(12) United States Patent
Baumberger

(10) Patent No.: US 7,739,684 B2
(45) Date of Patent: Jun. 15, 2010

(54) VIRTUAL DIRECT MEMORY ACCESS CROSSOVER

(75) Inventor: Daniel P. Baumberger, Cornlius, OR (US)

(73) Assignee: Intel Corporation, Santa Clara, CA (US)

( * ) Notice: Subject to any disclaimer, the term of this patent is extended or adjusted under 35 U.S.C. 154(b) by 1184 days.

(21) Appl. No.: 10/722,841

(22) Filed: Nov. 25, 2003

(65) Prior Publication Data

US 2005/0114855 A1   May 26, 2005

(51) Int. Cl.
*G06F 9/455* (2006.01)
(52) U.S. Cl. .......................................... 718/1
(58) Field of Classification Search ............. 718/1; 719/312–313; 709/213–215
See application file for complete search history.

(56) References Cited

U.S. PATENT DOCUMENTS

| | | | | |
|---|---|---|---|---|
| 4,396,978 A | * | 8/1983 | Hammer et al. | 710/110 |
| 7,111,303 B2 | * | 9/2006 | Macchiano et al. | 719/313 |
| 7,181,744 B2 | * | 2/2007 | Shultz et al. | 718/104 |
| 2003/0135658 A1 | * | 7/2003 | Haggar et al. | 709/312 |

* cited by examiner

*Primary Examiner*—Meng-Ai An
*Assistant Examiner*—Eric C Wai
(74) *Attorney, Agent, or Firm*—Blakely, Sokoloff, Taylor & Zafman LLP

(57) ABSTRACT

The present disclosure relates to the resource management of virtual machine(s) using information regarding the activity of the virtual machine(s), and, more specifically, to the facilitating communication between two or more virtual machines via the mapping of virtual resources to physical resources.

45 Claims, 3 Drawing Sheets

VIRTUAL DIRECT MEMORY ACCESS CROSSOVER

BACKGROUND

1. Field

The present disclosure relates to the resource management of virtual machine(s) using information regarding the activity of the virtual machine(s), and, more specifically, to the facilitating communication between two or more virtual machines via the mapping of virtual resources to physical resources.

2. Background Information

The virtualization of machine resources has been of significant interest for some time; however, with processors becoming more diverse and complex, such as processors that are deeply pipelined/super pipelined, hyperthreaded, and processors having Explicitly Parallel Instruction Computing (EPIC) architecture, and with larger instruction and data caches, virtualization of machine resources is becoming an even greater interest.

Many attempts have been made to make virtualization more efficient. For example, some vendors offer software products that have a virtual machine system that permits a machine to be partitioned, such that the underlying hardware of the machine appears as one or more independently operating virtual machines (VM). Typically, a Virtual Machine Monitor (VMM) may be a thin layer of software running on a computer and presenting to other software an abstraction of one or more VMs. Each VM, on the other hand, may function as a self-contained platform, running its own operating system (OS), or a copy of the OS, and/or a software application. Software executing within a VM is collectively referred to as "guest software".

A typical VMM, which may be considered the host of the VMs, may enhance performance of a VM by permitting access to the underlying physical machine in some situations. A VM may see and interact with a set of virtual resources. These virtual resources may then be mapped to physical resources. The VMM is typically responsible for mapping the virtual devices to the physical devices. In general, the mapping process is the same for all devices regardless of how the device is used.

FIG. 1 is a block illustrating an embodiment of an apparatus 101 for mapping resources amongst two virtual machines 111 & 112 in accordance with a known technique. Both virtual machines see instances of virtual devices 131 & 132. In one example, the virtual devices may be network interface cards. These virtual devices may be mapped, by the VMM 180, to the physical device 190. In the example, the physical device may also be a network interface card.

Typically, when the first VM 111 wishes to use the virtual device 131, it may write data to the device's virtual memory element 121. The VMM 180 would assure that when the first VM attempts to write data to the virtual memory element, it is in fact written to the physical memory element 181 of the physical device 190. The same process occurs when the second VM 112 uses its corresponding virtual device 132. In FIG. 1, the first VM illustrates the write case, while the second VM illustrates the read case. However, bi-directional communication is often the norm.

In an example where the deices are network interfaces, if the first VM 111 wishes to communicate with a device outside the apparatus 101, the first VM would write information to the physical device 190, and the physical device would then transmit the data outside the apparatus. The second VM 112 illustrates the read case. In this example, physical memory 181 illustrates the transmit buffer of the network interface, and physical memory 182 illustrates the receive buffer.

Typically, if the first VM 111 wishes to communicate with the second VM 112, the first VM attempts to communicate with the second VM as if the second VM was a device outside of the apparatus 101. As a result, data is written to the physical device 190, and then read from the physical device by the second virtual machine. In the network interface example, the loopback feature of the network interface is used to route the data from the first VM to the second VM, and vice versa.

This loopback solution is typically used by VMware, Inc. (VMware) of Palo Alto, Calif. The VMware solution provides for running two or more operating systems, such as Linux and Microsoft Windows, on a single machine, using the facilities provided by the operating system that runs on the underlying hardware.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
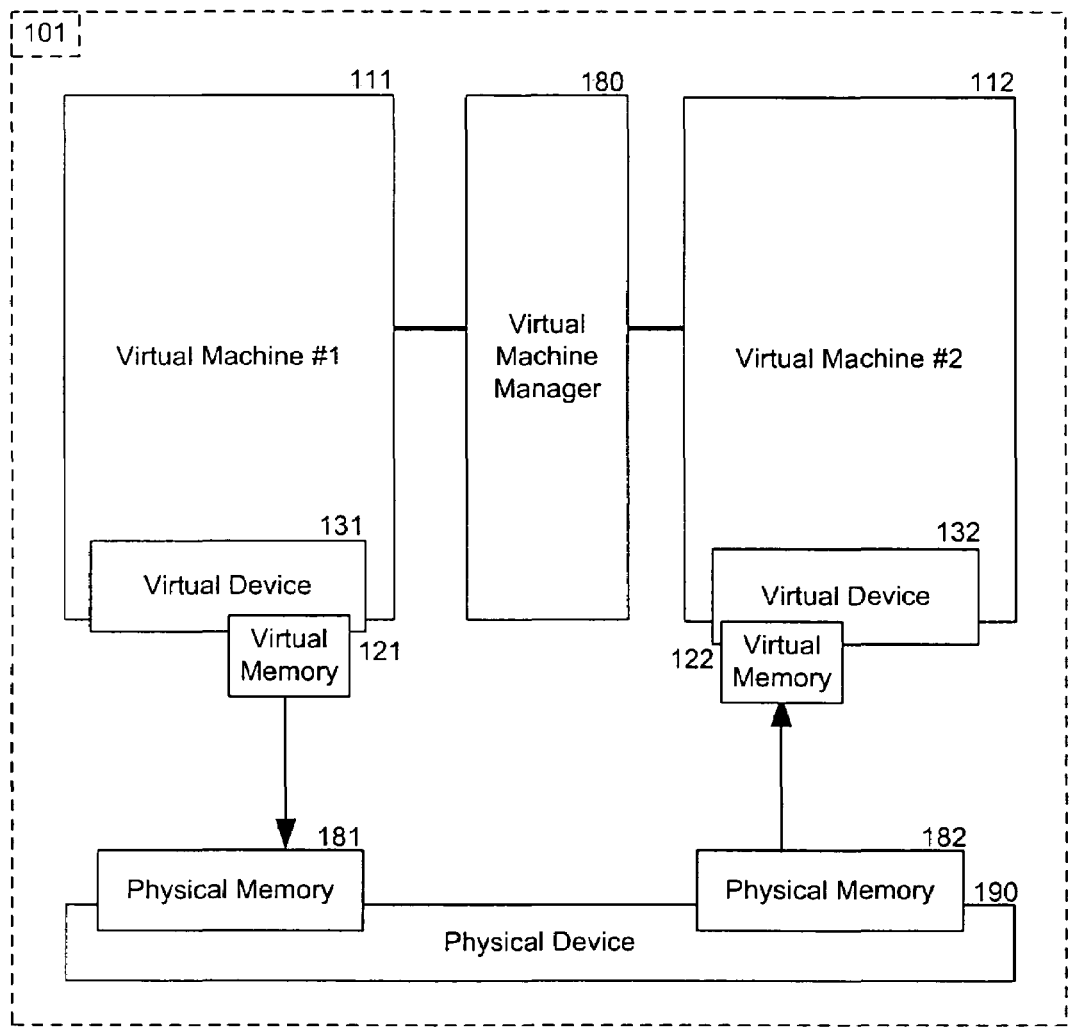
FIG. 1 is a block illustrating an embodiment of an apparatus for mapping resources amongst virtual machine(s) in accordance with a known technique.
Figure 2:
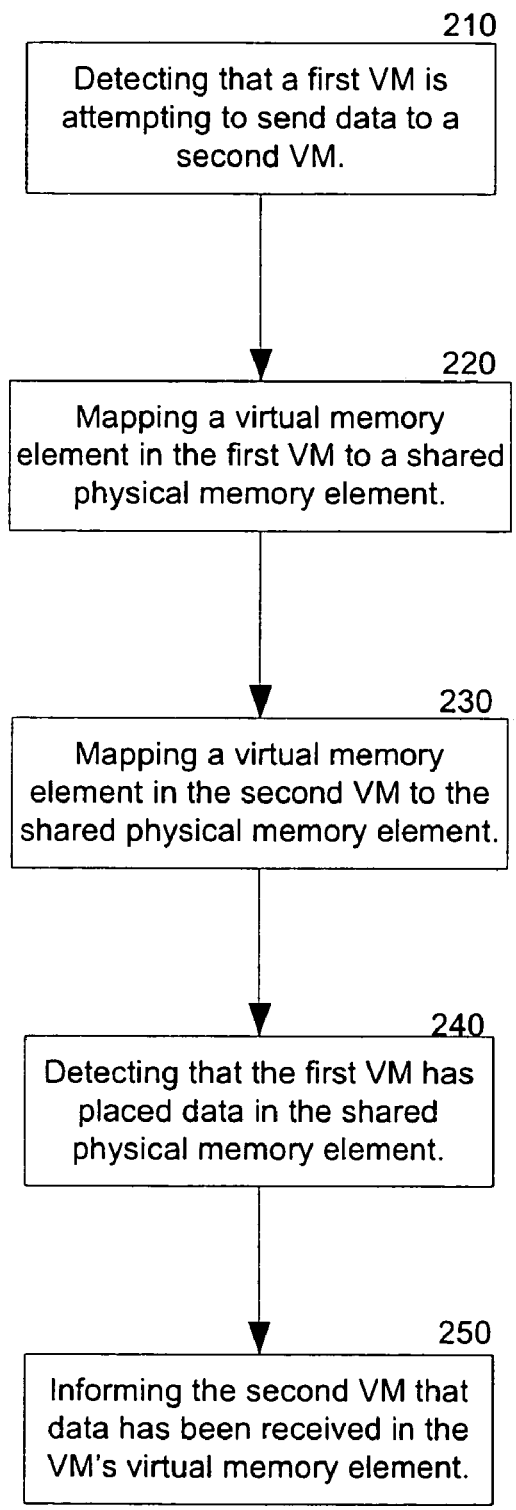
FIG. 2 is a flowchart illustrating an embodiment of a technique for mapping resources amongst virtual machine(s) in accordance with the disclosed subject matter.

FIG. 2 is a flowchart illustrating an embodiment of a technique for mapping resources amongst virtual machine(s) in accordance with the disclosed subject matter. Block 210 illustrates that a virtual machine manger (VMM) or some other device may detect that a first virtual machine (VM) is attempting to send data to a second VM. It is contemplated that, in one embodiment, the first VM may be expressly attempting to communicate with the second VM, such as, for example, transmitting an internet packet to the second VM. In another embodiment, the communication between the first and second VMs may be implicit. In one example, the output of a device on the first VM may be virtually coupled with the input of a device on the second VM. In instance of this is where the headphone port of the first VM's virtual sound device is configured to be coupled with the microphone port of the second VM's sound card. However, these are merely a few examples to which the disclosed subject matter is not limited.

Block 220 illustrates that the VMM may map a virtual memory element of the first VM to a shared physical memory element. In one embodiment, the VMM may accomplish this when a virtual device is mapped to a physical device. It is contemplated that any virtual memory elements of the virtual device may be mapped to the shared physical memory element. In one embodiment, the shared physical memory element may be part of a physical device that substantially corresponds to the virtual device, or the shared physical memory element may not correspond to the virtual device. It is contemplated that, in one embodiment, the shared physical memory element may be system memory or a direct memory access (DMA) capable element.

In one embodiment, the VMM may statically map the virtual memory element. Upon starting the first or the second VM, the VMM may detect that the first VM is configured to transmit data to the second VM. In one embodiment, a user may have explicitly instructed the VMM to virtually wire the two VMs together. In another embodiment, the two VMs may be implicitly virtually wired together, such as for example, a private network that only includes the VMs. In the statically mapped embodiment, the virtual memory element of the first VM may be statically mapped to the shared physical memory element. Likewise, the virtual memory element of the second VM may also be mapped to the shared physical memory element. In a specific embodiment, the virtual memory elements of the VMs may be parts of respective virtual network interfaces. In this specific embodiment, the virtual transmit buffer of the first VM may be statically mapped to a direct memory access (DMA) buffer. The virtual receive buffer of the second VM may also be statically mapped to the DMA buffer. It is contemplated that a second embodiment may occur that maps the virtual receive buffer of the first VM to another DMA buffer, and statically maps the transmit buffer of the second VM to the new DMA buffer. In this embodiment, the two VMs may be statically coupled in a matter that replicates a virtual cross-talk network connection.

In one embodiment, the VMM may dynamically remap the virtual memory element. If the VMM detects that the first VM is not attempting to send data to the second VM, the virtual memory element may be mapped to a physical device that substantially corresponds to the virtual device. In a specific illustrative embodiment, if the first VM is using a network interface to communicate with an outside device, the VM's virtual network interface may be mapped to the physical network interface. However, if the VMM detects that first VM is attempting to communicate with the second VM, the virtual memory element may be dynamically remapped to the shared physical memory element. In a specific illustrative embodiment, if the first VM is using a network interface to communicate with the second VM, the first VM's virtual network interface, specifically the transmit and receive buffers of the virtual network interface, may be dynamically remapped from the physical network interface to respective shared physical memory elements.

Block 230 illustrates that the VMM, or other device, may map a virtual memory element of the second VM to the shared physical memory element. As described above, in one embodiment, the VMM may accomplish this when a virtual device is mapped to a physical device. It is contemplated that any virtual memory elements of the virtual device may be mapped to the shared physical memory element. In one embodiment, the shared physical memory element may be part of a physical device that substantially corresponds to the virtual device, or the shared physical memory element may not correspond to the virtual device. It is contemplated that, in one embodiment, the shared physical memory element may be system memory or a direct memory access (DMA) capable element.

In one embodiment, the VMM may dynamically remap the virtual memory element. If the VMM detects that the first VM is not attempting to send data to the second VM, the virtual memory element may be mapped to a physical device that substantially corresponds to the virtual device. However, if the VMM detects that first VM is attempting to communicate with the second VM, the virtual memory elements of the first and second VMs may be dynamically remapped to the shared physical memory element.

In a specific illustrative embodiment, if the first VM is using a network interface to communicate with the second VM, the first VM's virtual transmit buffers of the virtual network interface may be dynamically remapped from the physical network interface to a first shared physical memory element. The second VM's virtual receive buffers of the second VM's virtual network interface may also be dynamically remapped to the first shared memory element. In order to enable two-way communication, the first VM's virtual receive buffer may be remapped to a second shared physical memory element, and the second VM's virtual transmit buffers may also be remapped to the second shared physical memory element.

Block 240 illustrates that once the two VMs are coupled via the shared physical memory element, the VMM may wait to detect that information has been placed in the shared physical memory element. In one embodiment, the VMM may monitor the shared memory element. In another embodiment, the VMM may monitor the activity of the first VM. In yet another embodiment the first VM may signal the VMM that the data has been placed in the shared memory element. However, these are merely a few non-limiting examples to which the disclosed subject matter is not limited.

Block 250 illustrates that the VMM, or as previously stated another device, may inform the second VM that data has been received in the VM's virtual memory element. The data may then be processed by the second VM. In one embodiment, the second VM may automatically detect that data has been received by its virtual memory element.

In a specific embodiment, of the technique illustrated by FIG. 2, two VMs may desire to communicate with one another using their respective Ethernet adapters. Other devices are within the scope of the disclosed subject matter; this however is a specific example. The VMM may have mapped the transmit buffer of the first VM's virtual Ethernet adapter to a shared physical direct memory access (DMA) buffer. The VMM may have also mapped the receive buffer of the second VM's virtual Ethernet adapter to the same shared physical direct memory access (DMA) buffer.

The guest driver in the first VM may place a packet to send in the shared DMA buffer, which is pointed to by the Ethernet adapter's transmit descriptor tail register (TDT). The guest driver may move the TDT to reflect that data has been written. The VMM may detect that the virtual TDT of the first VM has been altered. The VMM may move the receive descriptor head register (RDH) in the second VM's Ethernet adapter by the same number of entries as the TDT moved by the first VM. The VMM may mark the transmission as being complete, by updating the status bits of the receive descriptor for the second VM. The VMM may also inject any receive interrupts into the second VM to notify the guest driver that data has been received. Once the second VM's guest driver has read the data, by moving the receive descriptor tail register (RDT) past the new data entries, the VMM may inform the first VM, via interrupts and alteration of the virtual Ethernet register, that the transmission is complete. In this example, the shared physical memory element allows the two VMs to communicate as if they were physically connected via a cross-over Ethernet cable.

In one embodiment, the virtual devices of the two VMs may be substantially identical. In other embodiments, the two virtual devices may be of the same category (e.g. sound card, network adapter), but of different models or manufacturers. It is also contemplated that while one-way communication was illustrated by FIG. 2, bi-directional and one-to-many communication is within the scope of the disclosed matter. In one embodiment, bi-directional communication may utilize two shared memory elements, one for each direction. In another embodiment, bi-directional communication may utilize a single shared memory element. In one embodiment, the shared memory element may include many elements, and may not be contiguous.

Figure 3:
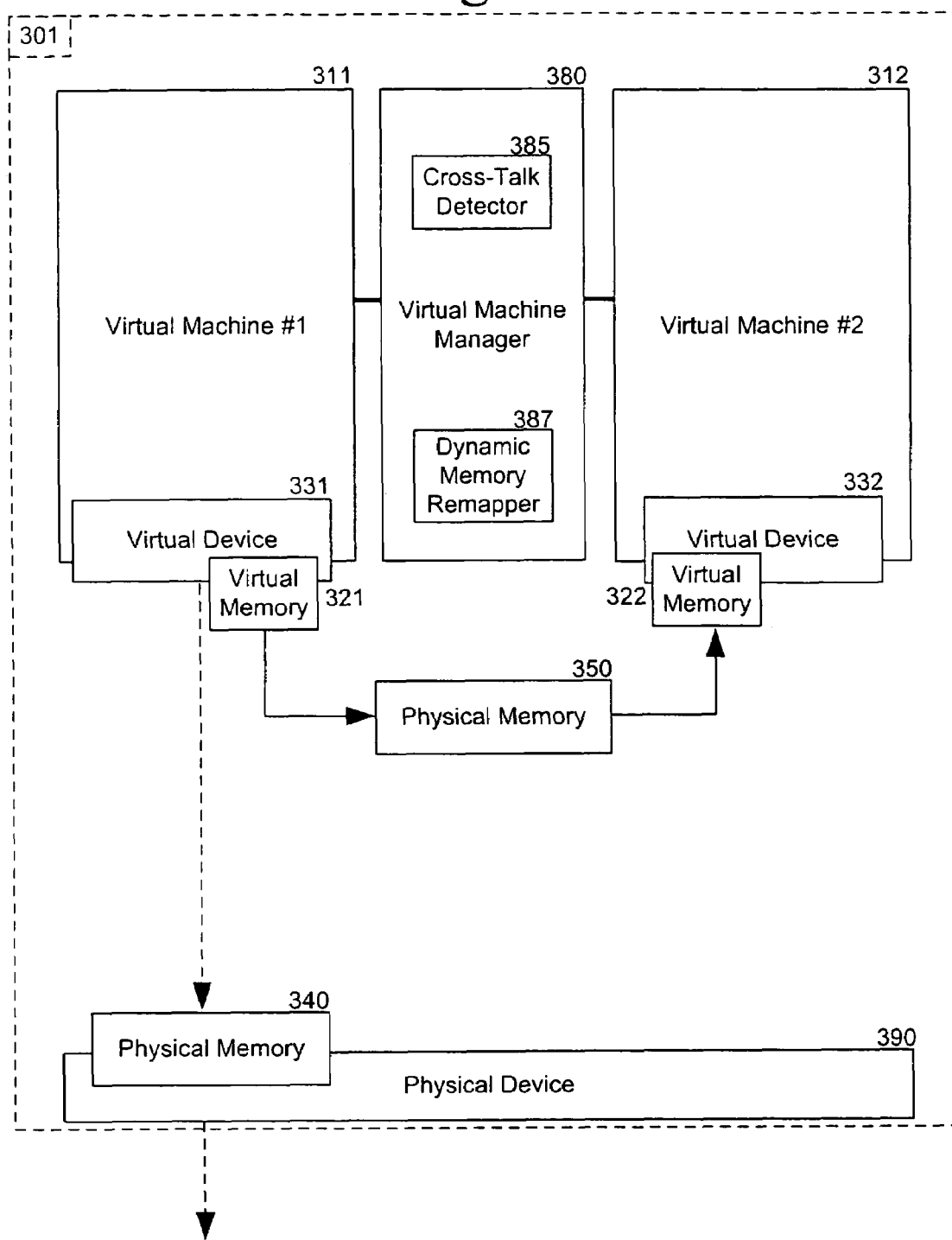
FIG. 3 is a block diagram illustrating an embodiment of an apparatus that allows for management of virtual machine(s) using information regarding the activity of the virtual machine(s) in accordance with the disclosed subject matter.

FIG. 3 is a block diagram illustrating an embodiment of an apparatus 301 that allows for management of virtual machine(s) using information regarding the activity of the virtual machine(s) in accordance with the disclosed subject matter. Virtual machine manager 380 may include a cross-talk detector 385 and a dynamic memory remapper 387. In one embodiment, the VMM may be capable of performing a technique similar to the one described above and illustrated by FIG. 2.

The cross-talk detector 385 may be capable of detecting when a first VM 311 is attempting to transmit data to a second VM 312. The dynamic memory remapper 387 may be capable of dynamically remapping the first virtual memory 321, which is part of the first virtual device 331, to shared physical memory element 350. The dynamic memory remapper may also be capable of remapping the second virtual memory 322, which is part of the second virtual device 332, to the shared physical memory element. The dynamic memory remapper may also be capable of mapping the first virtual memory element to the physical memory element 340 of the physical device 390. In one embodiment, the dynamic remapper may map the virtual memory element to the shared physical memory element or the physical memory element of the physical device based, at least in part, upon whether the cross-talk detector determines that the first VM is attempting to transmit data to the second VM or a device outside the apparatus 301.

In one embodiment, the cross-talk detector 385 may be capable of performing the technique illustrated by block 210 of FIG. 2. In one embodiment, the dynamic remapper may be capable of performing the technique illustrated by block 220 & 230 of FIG. 2. In one embodiment, the VMM 380 may be capable of performing the technique illustrated by blocks 240 & 250 of FIG. 2. In another embodiment, the technique illustrated by blocks 240 & 250 of FIG. 2 may instead be performed by the cross-talk detector.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method comprising:
   detecting that a first virtual machine is attempting to transmit data to a second virtual machine;
   mapping a transmitting memory element of the first virtual machine to a shared physical memory element, wherein the transmitting memory element of the first virtual machine is part of a first virtual device;
   mapping a receiving memory element of the second virtual machine to the shared physical memory element, wherein the receiving memory element of the second virtual machine is part of a second virtual device;
   placing data from the first virtual machine into the shared physical memory element via the transmitting memory element;
   receiving the placed data from the shared physical memory element into the second virtual machine via the receiving memory element;
   detecting if the first virtual machine is attempting to transmit data to a non-virtual machine; and
   dynamically remapping the transmitting memory element of the first virtual machine to a physical device associated with the transmitting memory element.

2. The method of claim 1, further including:
   detecting that the first virtual machine has placed data in the shared physical memory element; and
   informing the second virtual machine that data is available in the shared physical memory element.

3. The method of claim 1, wherein the first virtual device and the second virtual device are devices selected from a group including:
   an Ethernet device,
   a network interface,
   an audio device,
   a storage device, and
   a video device.

4. The method of claim 1, wherein the shared physical memory element is a direct memory access (DMA) buffer.

5. The method of claim 1, wherein detecting that the first virtual machine is attempting to transmit data to the second virtual machine includes:
   monitoring the first virtual machine;
   comparing a destination of any data transmitted by the first virtual machine to an address associated with the second virtual machine.

6. The method of claim 1, wherein detecting that the first virtual machine is attempting to transmit data to the second virtual machine includes:
   reading a mapping configuration data that specifies default virtual device to physical device mappings;

comparing the mapping configuration data for the first virtual machine to the mapping configuration data of the second virtual machine;

assuming that the first virtual machine is attempting to transmit data to the second virtual machine, if a transmitting virtual device of the first virtual machine is mapped to the same physical device as the receiving virtual device of the second virtual machine.

7. The method of claim 5, wherein mapping the transmitting memory element of the first virtual machine to the shared physical memory element includes:

determining if the transmitting memory element of the first virtual machine is currently mapped to a transmitting memory element of a physical device;

if so, unmapping of the transmitting memory element of the first virtual machine from the transmitting memory element of the physical device; and remapping the transmitting memory element of the first virtual machine to the shared physical memory element.

8. The method of claim 7, further including:

detecting that the second virtual machine is attempting to transmit data to the first virtual machine;

mapping a transmitting memory element of the second virtual machine to the shared physical memory element; and mapping a receiving memory element of the first virtual machine to the shared physical memory element.

9. An article comprising:

a machine accessible medium having a plurality of machine accessible instructions, wherein when the instructions are executed, the instructions provide for:

detecting that a first virtual machine is attempting to transmit data to a second virtual machine;

mapping a transmitting memory element of the first virtual machine to a shared physical memory element; wherein the transmitting memory element of the first virtual machine is part of a first virtual device;

mapping a receiving memory element of the second virtual machine to the shared physical memory element, wherein the receiving memory element of the second virtual machine is part of a second virtual device;

placing data from the first virtual machine into the shared physical memory element via the transmitting memory element;

receiving the placed data from the shared physical memory element into the second virtual machine via the receiving memory element;

detecting if the first virtual machine is attempting to transmit data to a non-virtual machine; and dynamically remapping the transmitting memory element of the first virtual machine to a physical device associated with the transmitting memory element.

10. The article of claim 9, further including instructions providing for:

detecting that the first virtual machine has placed data in the shared physical memory element; and informing the second virtual machine that data is available in the shared physical memory element.

11. The article of claim 9, wherein the first virtual device and the second virtual device are devices selected from a group including:

an Ethernet device,
a network interface,
an audio device,
a storage device, and
a video device.

12. The article of claim 9, wherein the shared physical memory element is a direct memory access (DMA) buffer.

13. The article of claim 9, wherein the instructions provide for detecting that the first virtual machine is attempting to transmit data to the second virtual machine includes instructions providing for:

monitoring the first virtual machine;

comparing a destination of any data transmitted by the first virtual machine to an address associated with the second virtual machine.

14. The article of claim 9, wherein the instructions provide for detecting that the first virtual machine is attempting to transmit data to the second virtual machine includes instructions providing for:

reading a mapping configuration data for each of the respective first and second virtual machines that specifies default mapping for transmitting and receiving memory elements of the respective first and second virtual machines to physical devices;

comparing the mapping configuration data for the first virtual machine to the mapping configuration data for the second virtual machine;

determining that the first virtual machine is attempting to transmit data to the second virtual machine if the transmitting memory element of the first virtual machine is mapped to the same physical device as the receiving virtual device of the second virtual machine.

15. The article of claim 13, wherein the instructions provide for mapping the transmitting memory element of the first virtual machine to the shared physical memory element includes instructions providing for:

determining if the transmitting memory element of the first virtual machine is currently mapped to a physical device;

if so, unmapping of the transmitting memory element from the physical device; and remapping the transmitting memory element of the first virtual machine to the shared physical memory element.

16. The article of claim 15, further including instructions providing for:

detecting that the second virtual machine is attempting to transmit data to the first virtual machine;

mapping a transmitting memory element of the second virtual machine to the shared physical memory element; and mapping a receiving memory element of the first virtual machine to the shared physical memory element.

17. A computer-implemented system comprising:

a first virtual machine having a first virtual device that includes a first virtual memory element, the first virtual memory element including a transmitting element of the first virtual machine;

a second virtual machine having a second virtual device that includes a second virtual memory element, the second virtual memory element including a receiving element of the second virtual machine;

a shared physical memory element of a physical device, and to which the first and second virtual memory elements may be mapped;

a virtual machine manager having a cross-talk detector to detect if the first virtual machine is attempting to transmit data to the second virtual machine, wherein the cross-talk detector is further detecting if the first virtual machine is attempting to transmit data to a non-virtual machine; and a dynamic memory remapper to, if instructed by the cross-talk detector upon the cross-talk detector detecting that the first virtual machine is attempting to transmit data to the second virtual machine, map the first virtual memory element of the first virtual machine to the second virtual memory element of the second virtual machine via the shared physical memory element, including:
mapping the transmitting memory element of the first virtual machine to the shared physical memory element; and
mapping the receiving memory element of the second virtual machine to the shared physical memory element;
wherein the dynamic memory remapper is further dynamically remapping the transmitting memory element of the first virtual machine to a physical device associated with the transmitting memory element of the first virtual machine.

18. The computer-implemented system of claim 17, wherein the cross-talk detector further:
detecting that the first virtual machine has placed data in the shared physical memory element; and
informing the second virtual machine that data is available in the shared physical memory element.

19. The computer-implemented system of claim 17, wherein the cross-talk detector is further monitoring the first and second virtual memory elements, wherein the first and second virtual memory elements are part of virtual devices selected from a group including:
an Ethernet device,
a network interface,
an audio device,
a storage device, and
a video device.

20. The computer-implemented system of claim 19, wherein the shared physical memory element is a direct memory access (DMA) buffer.

21. The computer-implemented system of claim 20, wherein the cross-talk detector is:
monitoring the first virtual machine;
comparing a destination of any data transmitted by the first virtual machine to an address associated with the second virtual machine to detect if the first virtual machine is attempting to transmit data to the second virtual machine.

22. The computer-implemented system of claim 17, wherein the dynamic memory remapper is:
determining if the transmitting memory element of the first virtual machine is currently mapped to a physical transmitting memory element of a physical device;
if so, unmapping the transmitting memory element of the first virtual machine from the physical transmitting memory element of the physical device; and
remapping the transmitting memory element of the first virtual machine to the shared physical memory element.

23. The computer-implemented system of claim 22, wherein the cross-talk detector is detecting that the second virtual machine is attempting to transmit data to the first virtual machine; and
wherein the dynamic memory remapper is mapping the transmitting memory element of the second virtual machine to the shared physical memory element; and
mapping the receiving memory element of the first virtual machine to the shared physical memory element.

24. The computer-implemented system of claim 17, wherein the first virtual memory element of the first virtual machine as compared to the second virtual memory element of the second virtual machine are not identical but share substantially similar characteristics.

25. A method of communicating between two virtual machines utilizing a virtual machine manager comprising:
detecting that a first virtual machine, having a first virtual network interface, is attempting to transmit data to a second virtual machine, having a second virtual network interface, via the virtual network interfaces;
mapping a transmitting memory element of the first virtual network interface to a first direct memory access buffer;
mapping a receiving memory element of the second virtual network interface to the first direct memory access buffer;
placing data from the first virtual machine into the first direct memory access buffer via the transmitting memory element of the first virtual network interface;
receiving the placed data from the first direct memory access buffer into the second virtual machine via the receiving memory element of the second virtual network interface;
mapping a receiving memory element of the first virtual network interface to a second direct memory access buffer;
mapping a transmitting memory element of the second virtual network interface to the second direct memory access buffer;
placing data from the second virtual machine into the second direct memory access buffer via the transmitting memory element of the second virtual network interface; and
receiving the placed data from the second direct memory access buffer into the first virtual machine via the receiving memory element of the first virtual network interface.

26. The method of claim 25, further including:
detecting that the first virtual machine has placed data in the first direct memory access buffer;
informing the second virtual machine that data is available in the first direct memory access buffer;
detecting that the second virtual machine has placed data in the second direct memory access buffer; and
informing the first virtual machine that data is available in the second direct memory access buffer.

27. The method of claim 25, further comprising the first virtual machine:
placing at least one packet into the first direct memory access buffer; and
moving a tail register of the first virtual network interface to indicate how many packets where written to the first direct memory access buffer.

28. The method of claim 27, further comprising the virtual machine manager:
moving a receive descriptor head register of the second virtual network interface by a number of packets written to the first direct memory access buffer;
updating the status of the second network interface to indicate that a packet has been received; and
sending a receive interrupt to the second virtual machine.

29. The method of claim 28, further comprising the second virtual machine:
reading a packet from the first direct memory access buffer, wherein the packet is read from the number of packets previously written to the first direct memory access buffer.

30. The method of claim 29, further comprising, the virtual machine manager:
detecting that the second virtual machine has read the packet from the first direct memory buffer;

updating the status of the first virtual network interface to indicate that the packet has been received; and
injecting a transmit complete interrupt to the first virtual machine.

31. The method of claim 25, wherein detecting that the first virtual machine is attempting to transmit data to the second virtual machine includes:
monitoring the first virtual machine;
comparing a destination of any data transmitted by the first virtual machine to an address associated with the second virtual machine.

32. A method comprising:
detecting that a first virtual machine is configured to transmit data to a second virtual machine;
statically mapping a transmitting memory element of the first virtual machine to a shared physical memory element;
statically mapping a receiving memory element of the second virtual machine to the shared physical memory element;
placing data from the first virtual machine into the shared physical memory element via the transmitting memory element;
receiving the placed data from the shared physical memory element into the second virtual machine via the receiving memory element;
detecting that the first virtual machine is configured to transmit data to a non-virtual machine; and
dynamically remapping the transmitting memory element of the first virtual machine to a physical device associated with the transmitting memory element.

33. The method of claim 32, further comprising:
statically mapping a receiving memory element of the first virtual machine to the shared physical memory element;
statically mapping a transmitting memory element of the second virtual machine to the shared physical memory element;
placing data from the second virtual machine into the shared physical memory element via the transmitting memory element of the second virtual machine; and
receiving the placed data from the shared physical memory element into the first virtual machine via the receiving memory element of the first virtual machine.

34. The method of claim 32, wherein detecting that the first virtual machine is configured to transmit data to the second virtual machine is performed when the first virtual machine is started.

35. The method of claim 34, wherein detecting that the first virtual machine is configured to transmit data to the second virtual machine includes reading a configuration file that explicitly denotes that the first and second virtual machines are virtually coupled.

36. The method of claim 34, wherein detecting that the first virtual machine is configured to transmit data to the second virtual machine includes reading a configuration file that implicitly denotes that the first and second virtual machines are virtually coupled.

37. The method of claim 34, wherein the shared physical memory element comprises a direct access memory buffer.

38. The method of claim 37, wherein the transmitting and receiving virtual memory elements of the respective first and second virtual machines are part of virtual devices selected from a group of virtual devices comprising:
an Ethernet device;
a network device;
an audio device; a storage device; and
a video device.

39. An article comprising:
a machine accessible medium having a plurality of machine accessible instructions, wherein when the instructions are executed, the instructions provide for:
detecting that a first virtual machine is configured to transmit data to a second virtual machine;
statically mapping a transmitting memory element of the first virtual machine to a shared physical memory element, wherein the transmitting memory element of the first virtual machine is part of a first virtual device;
statically mapping a receiving memory element of the second virtual machine to the shared physical memory element, wherein the receiving memory element of the second virtual machine is part of a second virtual device;
placing data from the first virtual machine into the shared physical memory element via the transmitting memory element;
receiving the placed data from the shared physical memory element into the second virtual machine via the receiving memory element;
detecting if the first virtual machine is attempting to transmit data to a non-virtual machine; and
dynamically remapping the transmitting memory element of the first virtual machine to a physical device associated with the transmitting memory element.

40. The article of claim 39, further comprising instructions providing for:
statically mapping a receiving memory element of the first virtual machine to the shared physical memory element, wherein the receiving memory element of the first virtual machine is part of the first virtual device; and
statically mapping a transmitting memory element of the second virtual machine to the shared physical memory element, wherein the transmitting memory element of the second virtual machine is part of the second virtual device.

41. The article of claim 39, wherein the instructions providing for detecting that the first virtual machine is configured to transmit data to the second virtual machine are executed when the first virtual machine is started.

42. The article of claim 41, wherein the instructions providing for detecting that the first virtual machine is configured to transmit data to the second virtual machine includes instructions providing for reading a configuration file that explicitly denotes that the first and second virtual machines are virtually coupled.

43. The article of claim 41, wherein the instructions providing for detecting that the first virtual machine is configured to transmit data to the second virtual machine includes instructions providing for reading a configuration file that implicitly denotes that the first and second virtual machines are virtually coupled.

44. The article of claim 41, wherein the instructions provide for the shared physical memory element comprising a direct access memory buffer.

45. The article of claim 44, wherein the transmitting and receiving virtual memory elements of the respective first and second virtual machines are part of virtual devices selected from a group of virtual devices comprising:
an Ethernet device;
a network device;
an audio device; a storage device; and
a video device.

* * * * *